US010205316B1

(12) United States Patent
Jojima et al.

(10) Patent No.: US 10,205,316 B1
(45) Date of Patent: Feb. 12, 2019

(54) MOUNTING STRUCTURE FOR POWER CONVERTER IN VEHICLE

(71) Applicant: TOYOTA JIDOSHA KABUSHIKI KAISHA, Toyota-shi, Aichi (JP)

(72) Inventors: Yuki Jojima, Nagoya (JP); Shuichi Iwata, Nisshin (JP); Hiromi Yamasaki, Toyota (JP); Tomoo Yamabuki, Nagoya (JP); Hitoshi Imura, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/123,843

(22) Filed: Sep. 6, 2018

(30) Foreign Application Priority Data

Oct. 2, 2017 (JP) ................................ 2017-192588

(51) Int. Cl.

*B60K 1/04* (2006.01)
*H02J 1/00* (2006.01)
*B60L 11/18* (2006.01)
*H02M 7/00* (2006.01)

(52) U.S. Cl.

CPC .................. *H02J 1/00* (2013.01); *B60K 1/04* (2013.01); *B60L 11/1803* (2013.01); *B60L 11/1851* (2013.01); *H02M 7/003* (2013.01); *B60K 2001/0411* (2013.01); *B60L 2210/14* (2013.01)

(58) Field of Classification Search

CPC ..... H02J 1/00; B60K 1/04; B60K 2001/0411; H02M 7/003; B60L 11/1803; B60L 11/1851

See application file for complete search history.

(56) References Cited

U.S. PATENT DOCUMENTS

2010/0033011 A1* 2/2010 Okazaki .................... B60L 7/12 307/9.1
2014/0175867 A1 6/2014 Sung et al.
2015/0069832 A1* 3/2015 Yamane .................. B60L 3/003 307/10.1
2017/0170744 A1* 6/2017 Kouno .................. H02M 7/003

FOREIGN PATENT DOCUMENTS

JP 2006-033934 A 2/2006
JP 2014-078553 A 5/2014

* cited by examiner

*Primary Examiner* — Daniel Cavallari-See

(74) *Attorney, Agent, or Firm* — Oliff PLC

(57) ABSTRACT

A mounting structure for a power converter in a vehicle is provided. The power converter includes a plurality of voltage converter circuits connected in parallel, and each of the plurality of voltage converter circuits includes a reactor, in which the power converter includes: a main body containing at least one of the reactors and a switching device of the voltage converter circuits; and a sub-body containing remaining reactors, the sub-body being electrically connected to the main body by a cable. The main body is fixed to a vehicle body via a bracket in a front compartment such that a gap is provided below the main body, and the sub-body is connected to a lateral side of the main body in a vehicle width direction such that a front end of the sub-body aligns with a front end of the main body.

2 Claims, 5 Drawing Sheets

100
10
9a
5a
92c
91
90
92a
4
7
6a
3
5b
6b
92d
92b
9b
8
5a
4
6a
5b
6b
11
9c
4
9d
4
9e
4
9f
4

MOUNTING STRUCTURE FOR POWER CONVERTER IN VEHICLE

CROSS-REFERENCE

This application claims priority to Japanese patent application No. 2017-192588, filed on Oct. 2, 2017, the entire contents of which are incorporated herein by reference.

TECHNICAL FIELD

The present disclosure relates to a mounting structure in a vehicle for a power converter in which a plurality of voltage converter circuits each including a reactor is connected in parallel.

BACKGROUND

An electric vehicle includes a power converter that converts power of a DC power source into power that drives a drive motor. A power converter is often mounted in a front compartment of a vehicle. A power converter includes a plurality of voltage converter circuits connected in parallel (see, for example, Japanese Patent Application Publication No. 2006-33934). The voltage converter circuits are of a chopper type, and each of the voltage converter circuits includes a reactor. Since the reactor has a large heating value, the load (heating value) of each reactor can be reduced by the parallel connection of the plurality of voltages converter circuits. Further, for example, United States Patent Application Publication No. US 2014/0175867 discloses a technology for fixing a power converter onto a transmission and containing only a reactor into a body of the transmission. The reactor is cooled together with a gear by refrigerant contained in the transmission.

SUMMARY

Of those components which constitute a voltage converter circuit, the reactor is especially bulky. Meanwhile, a power converter includes components such as a switching device and a control board of the voltage converter circuit in addition to the reactor. An attempt to contain a plurality of bulky reactors and other various components into one body may cause a wasted space inside the body, and upsizes the body. In this case, it is conceivable that some reactors may be contained in another body. For example, some of all reactors that can be placed with high space efficiency together with the switching device and the like are contained in a main body. The remaining reactors that cannot be contained in the main body with high space efficiency are contained in another body (sub-body), and the main body and the sub-body are electrically connected to each other by a cable. Doing so makes it possible to give a power converter with higher space efficiency through a combination of the main body and the sub-body.

On the other hand, in a case where the main body and the sub-body are mounted in a front compartment of a vehicle, the cable by which the main body and the sub-body are electrically connected to each other may be cut if the sub-body is separated from the main body by the impact of a collision. A high voltage for use in motor driving is applied to a cable connected to a reactor. It is not preferable that a cable to which a high voltage is applied be cut. For a power converter including a sub-body containing reactors to which a high voltage is applied, a mounting structure in a vehicle is provided that makes it hard for the sub-body to be separated from a main body at the time of a collision.

The present disclosure provides a mounting structure for a power converter in a vehicle, including a plurality of voltage converter circuits connected in parallel, each of the plurality of voltage converter circuits includes a reactor. In the mounting structure, the power converter may comprise: a main body containing at least one of the reactors and a switching device of the voltage converter circuits; and a sub-body containing remaining reactors, the sub-body being electrically connected to the main body by a cable. The main body may be fixed to a vehicle body via a bracket in a front compartment such that a gap is provided below the main body. The sub-body may be connected to a lateral side of the main body in a vehicle width direction such that a front end of the sub-body aligns with a front end of the main body.

In the mounting structure in a vehicle according to the present disclosure, the main body is fixed to a vehicle body such that a gap is provided below the main body, and the sub-body is connected to a lateral side of the main body such that a front end of the sub-body aligns with a front end of the main body. Since the front end of the sub-body aligns with the front end of the main body, the collision load of a collision with an obstacle from the front is received by both the main body and the sub-body and the load is dispersed, so that damage to each of the bodies is reduced. Further, since the bodies are supported by the vehicle body such that a gap is provided therebelow, a space for retraction can be secured for bodies (namely the main body and the sub-body) subjected to impact, so that the impact of a collision is cushioned. In particular, since the front end of the sub-body aligns with the front end of the main body, both the main body and the sub-body retract together. This reduces the possibility of the sub-body coming off from the main body.

Details of the present disclosure and further improvement are described in section "DETAILED DESCRIPTION" below.

DETAILED DESCRIPTION

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved mounting structure for a power converter in a vehicle.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Figure 1:
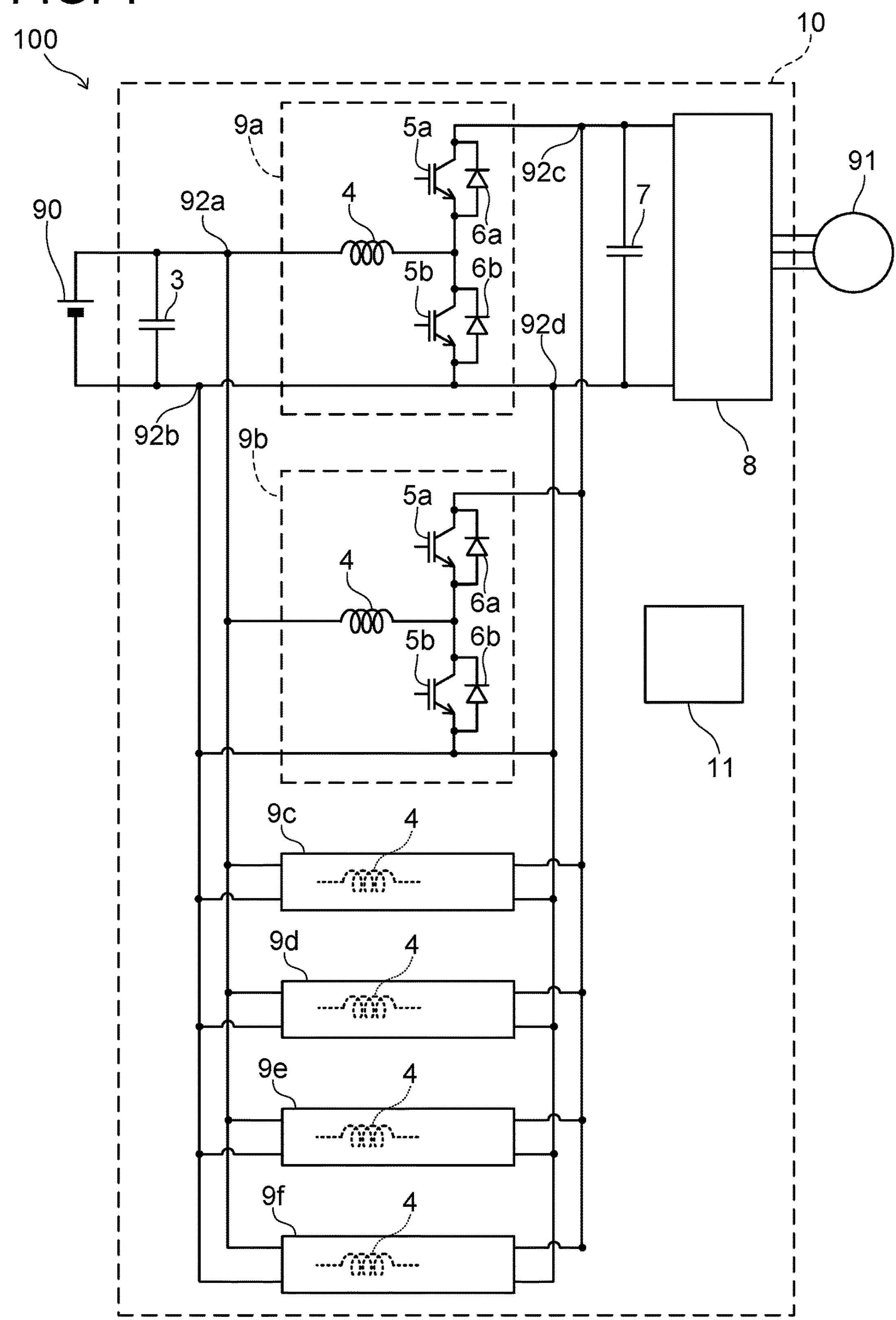
FIG. 1 is a block diagram of a power system of an electric vehicle to which a mounting structure in a vehicle according to an embodiment is applied.

A mounting structure in a vehicle according to an embodiment will be described with reference to the drawings. The mounting structure in a vehicle according to the embodiment is applied to a power converter 10 of an electric vehicle 100. Firstly, a circuit of the power converter 10 will be described. FIG. 1 is a block diagram showing a power system of the electric vehicle 100 including the power converter 10. The electric vehicle 100 includes a battery 90, a drive motor 91, and the power converter 10. The power converter 10 converts DC power of the battery 90 into AC power suited to driving the motor 91. The motor 91 of the electric vehicle 100 generates power by means of kinetic energy of the vehicle when the driver steps on the brake pedal. The power generated by kinetic energy of the vehicle is also called "regenerative power". The power converter 10 also has a function of charging the battery 90 by converting the AC regenerative power into DC power.

The power converter 10 includes a filter capacitor 3, a smoothing capacitor 7, an inverter circuit 8, and six voltage converter circuits 9*a* to 9*f*. The six voltage converter circuits 9*a* to 9*f* are connected in parallel between common low-voltage terminals 92*a* and 92*b* and common high-voltage terminals 92*c* and 92*d*. The filter capacitor 3 is connected between the common low-voltage terminals 92*a* and 92*b*, and the smoothing capacitor 7 is connected between the common high-voltage terminals 92*c* and 92*d*.

The voltage converter circuit 9*a* will be described. The voltage converter circuit 9*a* includes two switching devices 5*a* and 5*b*, two diodes 6*a* and 6*b*, and a reactor 4. The two switching devices 5*a* and 5*b* are connected in series between the high-voltage terminals 92*c* and 92*d*. The switching devices 5*a* and 5*b* are power-converting transistors and, for example, are insulated gate bipolar transistors (IGBTs). The diode 6*a* is connected in antiparallel to the switching device 5*a*, and the diode 6*b* is connected in antiparallel to the switching device 5*b*. The reactor 4 has one end connected to the low-voltage terminal 92*a* (positive electrode) and the other end connected to a middle point of the series connection of the two switching devices 5*a* and 5*b*. The low-voltage terminal 92*b* (negative electrode) and the high-voltage terminal 92*d* (negative electrode) are directly connected.

The voltage converter circuit 9*a* includes a step-up function of boosting the voltage of power applied to the low-voltage terminals 92*a* and 92*b* and outputting it to the high-voltage terminals 92*c* and 92*d*. The voltage converter circuit 9*a* also includes a step-down function of lowering the voltage of power applied to the high-voltage terminals 92*c* and 92*d* and outputting it to the low-voltage terminals 92*a* and 92*b*. The voltage converter circuit 9*a* is a so-called bidirectional DC-DC converter circuit. The switching device 5*a*, which is closer to the high-voltage terminal 92*c* (positive electrode), is responsible for a step-down operation, and the switching device 5*b*, which is closer to the high-voltage terminal 92*d* (negative electrode), is responsible for a step-up operation. By means of a switching operation of the switching devices 5*a* and 5*b*, the voltage converter circuit 9*a* changes the voltage of inputted power by storing electric energy in the reactor 4 and releasing the stored electric energy. Supplying the switching devices 5*a* and 5*b* with a complementary PWM signal with a predetermined duty ratio causes a passive switch between step-up and step-down depending on a magnitude relationship between power (battery power) that is applied to the low-voltage terminals 92*a* and 92*b* and power (regenerative power) that is applied to the high-voltage terminals 92*c* and 92*d*. A circuit detailed configuration and function of the voltage converter circuit 9*a* of FIG. 1 is omitted from the detailed description, as they are well known.

The voltage converter circuit 9*b* has the same circuit configuration as the voltage converter circuit 9*a*. The voltage converter circuits 9*c* to 9*f* also have the same circuit configurations as the voltage converter circuit 9*a*. Therefore, FIG. 1 omits to illustrate the configurations of the voltage converter circuits 9*c* to 9*f*. However, in order to show that the voltage converter circuits 9*c* to 9*f* also include reactors 4, FIG. 1 illustrates the reactors 4 with dotted lines in rectangles representing the voltage converter circuits 9*c* to 9*f*.

The inverter circuit 8 converts DC power that is supplied from the voltage converter circuits 9*a* to 9*f* into AC power and outputs the AC power to the motor 91. In some cases, the inverter circuit 8 converts AC regenerative power generated by the motor 91 into DC power and outputs the DC power to the voltage converter circuits 9*a* to 9*f*. The inverter circuit 8 includes a plurality of switching devices. A configuration of the inverter circuit 8 is omitted from the detailed description, as it is well known.

The switching devices 5*a* and 5*b* of the voltage converter circuits 9*a* to 9*f* and the switching devices of the inverter circuit 8 are controlled by a controller 11. The controller 11 receives a command from a superior controller (not illustrated) and generates drive signals that bring the switching devices into operation. The superior controller computes a target output of the motor 91 from the vehicle speed and the acceleration opening degree and sends the target output to the controller 11. The controller 11 generates drive signals for the switching devices 5*a* and 5*b* and the switching devices of the inverter circuit 8 so that the target output is achieved.

Power of several tens of kilowatts flows between the battery 90 and the motor 91. The reactors 4, which store and release such high-power energy, are bulkier than the other electronic components. The power converter 10 includes six reactors 4. Containing the six reactors 4 and the other electronic components in one body, may result in poorer space efficiency. The power converter 10 includes two bodies (namely a main body 12 and a sub-body 13), and the six reactors 4 are dispersedly contained in the two bodies.

Figure 2:
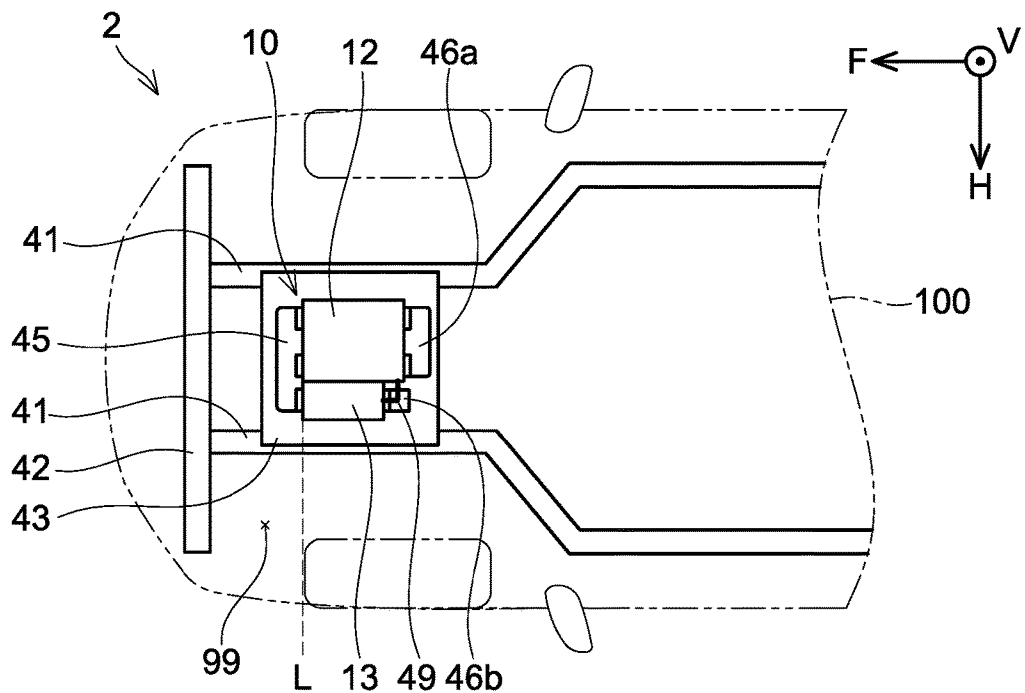
FIG. 2 is a plan view illustrating the mounting structure in a vehicle according to the embodiment.
Figure 3:
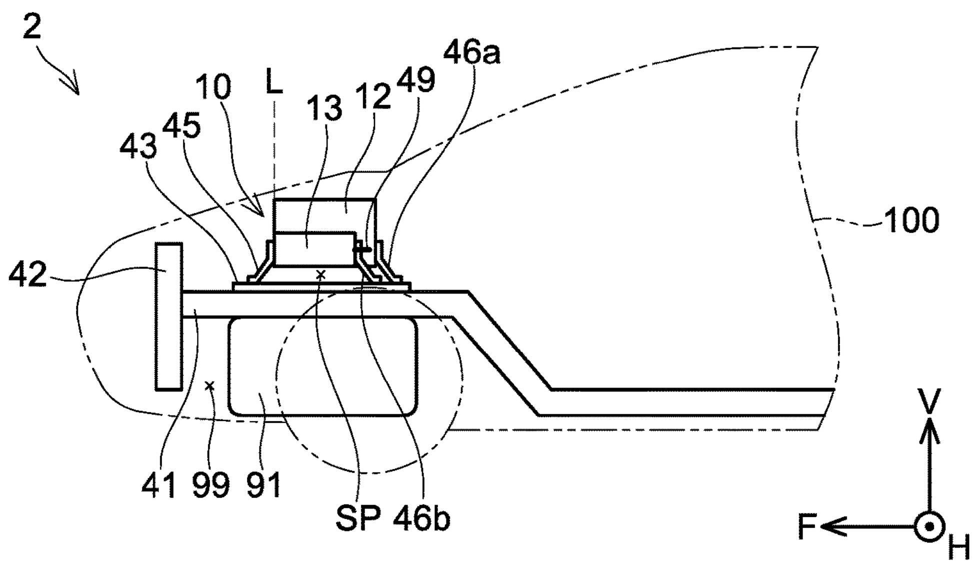
FIG. 3 is a side view illustrating the mounting structure in a vehicle according to the embodiment.
Figure 4:
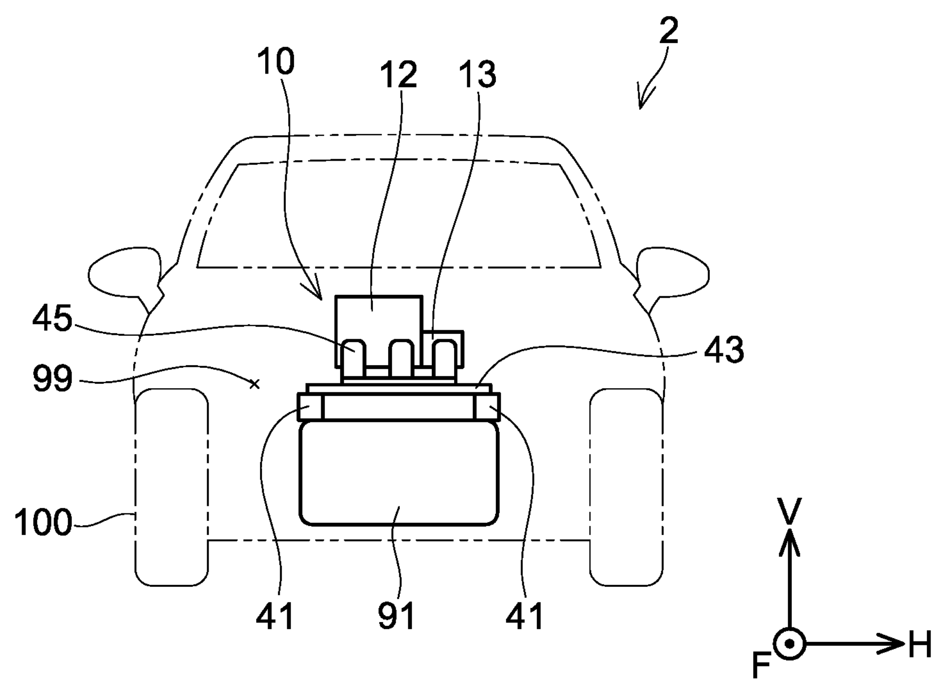
FIG. 4 is a front view illustrating the mounting structure in a vehicle according to the embodiment.

A mounting structure 2 for the power converter 10 in a vehicle will be described with reference to FIGS. 2 to 6. FIGS. 2 to 4 show the power converter 10 mounted in the electronic vehicle 100. FIGS. 2 to 4 show only components that are needed to describe the mounting structure 2 and omit to illustrate the other components. FIGS. 2 to 4 illustrate a body and wheels of the electric vehicle 100 with virtual lines. FIGS. 2 to 6 also show a coordinate system that indicates the orientation of the body of the electric vehicle 100. The positive direction of an F axis of the coordinate system corresponds to the front of the vehicle. The positive direction of a V axis of the coordinate system corresponds to the upper part of the vehicle. The positive direction of an HI axis of the coordinate system corresponds to a left side direction of the vehicle.

FIG. 2 is a plan view illustrating the mounting structure 2. FIG. 3 is a side view illustrating the mounting structure 2. FIG. 4 is a front view illustrating the mounting structure 2. FIGS. 2 and 3 omit to illustrate a rear part of the vehicle.

The power converter 10 is mounted in a front compartment 99 of the vehicle. As previously stated, the power converter 10 includes two bodies, i.e. the main body 12 and the sub-body 13. The main body 12 and the sub-body 13 are placed next to each other in a vehicle width direction, and are coupled to each other. The main body 12 and the sub-body 13 are fixed to each other such that a front end of the main body 12 aligns with a front end of the sub-body 13. A straight line L in FIGS. 2 and 3 indicates a front end that is common to the main body 12 and the sub-body 13. The main body 12 and the sub-body 13 are electrically connected to each other by a cable 49.

The main body 12 and the sub-body 13 are fixed over a cross-plate 43 by a front bracket 45 and rear brackets 46*a* and 46*b* such that there is a gap SP. The front bracket 45 and the rear brackets 46*a* and 46*b* have their lower ends fixed to the cross-plate 43 and have their upper ends coupled to the main body 12 and the sub-body 13.

As previously stated, the front end of the main body 12 and the front end of the sub-body 13 are at the same position in a vehicle anteroposterior direction, and are connected to the common front bracket 45. The sub-body 13 is shorter in length than the main body 12. The main body 12 has its rear end coupled to the rear bracket 46*a*, and the sub-body 13 has its rear end coupled to the rear bracket 46*b*.

The cross plate 43 is placed over a pair of side members 41 extending in the vehicle anteroposterior direction. The pair of side members 41 has their front ends coupled to a radiator frame 42. It should be noted that FIG. 4 omits to illustrate the radiator frame 42. The motor 91 is suspended over the pair of side members 41 via a vibration-proof mount (not illustrated). Since the power converter 10 supplies power to the motor 91, it is of great convenience to place the power converter 10 near the motor 91 to reduce a transmission loss of power.

Figure 5:
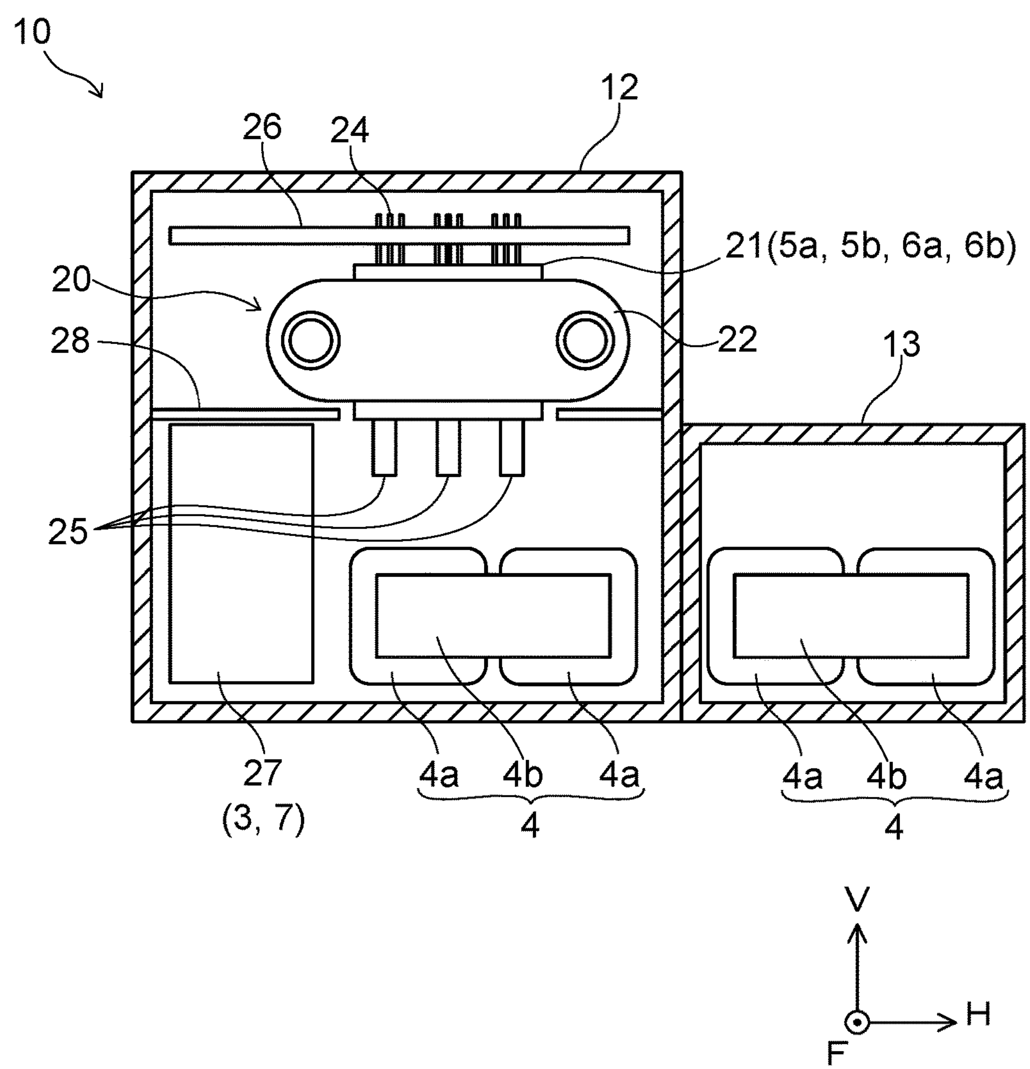
FIG. 5 is a cross-sectional view of a power converter cut along a plane including an H axis and a V axis in the drawing.
Figure 6:
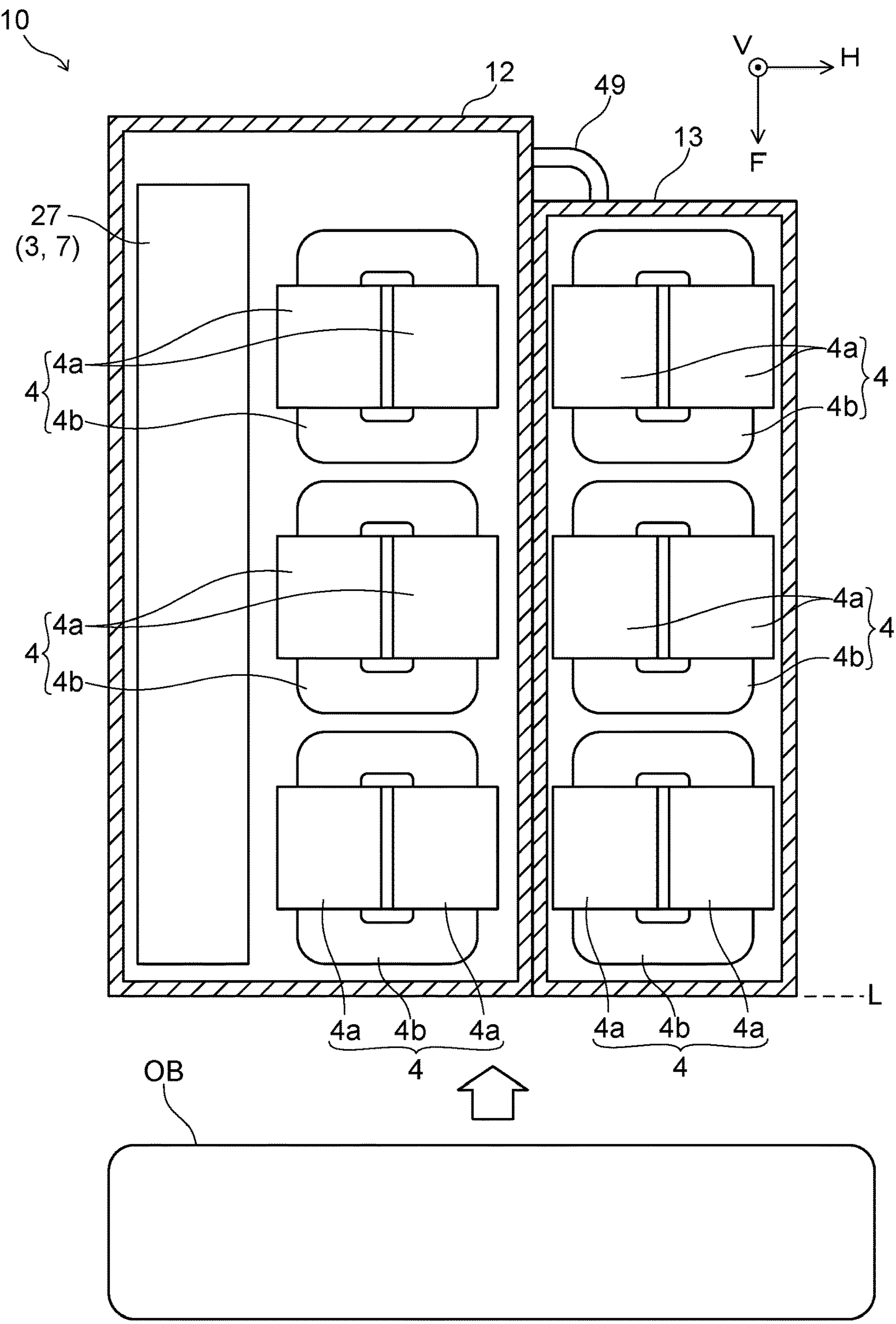
FIG. 6 is a cross-sectional view of the power converter cut along a plane including an F axis and the H axis in the drawing.

FIG. 5 is a cross-sectional view of the main body 12 and the sub-body 13 cut along a plane including the V and H axes of the coordinate system in the drawing, and FIG. 6 is a cross-sectional view of the main body 12 and the sub-body 13 cut along a plane including the F and 1F axes of the coordinate system in the drawing. FIG. 5 is a cross-sectional view obtained by cutting front side plates of the main body 12 and the sub-body 13. FIG. 6 shows a cross-section of the main body 12 obtained by cutting it below an inside partition plate 28 and a cross-section of the sub-body 13 obtained by cutting an upper plate.

The main body 12 contains a control board 26, a stacked unit 20, a capacitor unit 27, and three reactors 4. The stacked unit 20 is a unit obtained by alternately stacking a plurality of coolers 22 and a plurality of semiconductor modules 21 one by one. One semiconductor module 21 has two switching devices and two diodes sealed therein. The two switching devices are connected in series, and each of the diodes is connected in antiparallel to a corresponding one of the switching devices. The switching devices 5*a* and 5*b* and diodes 6*a* and 6*b* of one voltage converter circuit 9*a* (see FIG. 1) are contained in a semiconductor module 21. The power converter 10 includes the six voltage converter circuits 9*a* and 9*f*, and the stacked unit 20 includes six semiconductor modules 21 respectively corresponding to the six voltage converter circuits 9*a* and 9*f*. Further, the inverter circuit 8 also includes a plurality of switching devices, and the stacked unit 20 also includes a semiconductor module 21 containing the switching devices of the inverter circuit 8. The coolers 22 are in contact with both sides of each semiconductor module 21. Each of the semiconductor modules 21 is cooled by the coolers 22 from both sides.

The control board 26 is mounted with the controller 11 shown in FIG. 1. The semiconductor module 21 has its control terminals 24 connected to the control board 26. The plurality of control terminals 24 include terminals connected to the gates of the switching devices contained in the semiconductor module 21 and a terminal of a temperature sensor included in the semiconductor module 21.

Three power terminals 25 extend from a lower surface of the semiconductor module 21. The three power terminals 25 are connected to a high-voltage side, a middle point, and a low-voltage side, respectively, of the series connection of the switching devices. The three power terminals 25 are connected to the capacitor unit 27 and the reactors 4 via bus bars, of which illustration is omitted from the drawings.

The capacitor unit 27 contains a plurality of capacitor devices, and those capacitor devices correspond to the tilter capacitor 3 and smoothing capacitor 7 of FIG. 1.

The main body 12 contains three reactors 4 in addition to the control board 26, the semiconductor modules 21 containing switching devices, and the capacitor unit 27 (see FIG. 6). Since FIG. 6 shows a cross-section obtained by cutting the main body 12 below the inside partition plate 28 shown in FIG. 5, FIG. 6 omits to illustrate the control board 26 and the stacked unit 20.

The sub-body 13 contains another three reactors 4 (see FIG. 6). Each of the reactors 4 is constituted by a ring-shaped core 4*b* and two coils 4*a*. The two coils 4*a* are attached to the ring-shaped core 4*b* so as to be parallel to each other. The two coils 4*a* are made of one winding wire and are electrically one coil. Since power of several tens of kilowatts flows through the reactors 4, the reactors 4 are bulkier than the other electronic components.

The main body 12 and the sub-body 13 are electrically connected to each other by the cable 49. The cable 49 is connected to a rear side plate of the sub-body 13 and a lateral side plate of the main body 12. The cable 49 is electrically connected to the reactors 4 inside each of the main body 12 and the sub-body 13; however, the routing of the cable 49 in the bodies is not illustrated. Power of several tens of kilowatts that drives the drive motor 91 flows through the cable 49.

Features of the above-described mounting structure 2 will be described. The power converter 10 is mounted in a front compartment 99 of the vehicle. The power converter 10 includes a plurality of voltage converter circuits 9*a* to 9*f* each including a reactor 4, and the plurality of voltage converter circuits 9*a* to 9*f* are connected in parallel. Components that constitute the circuits of the power converter 10 are dispersedly contained in two bodies (namely a main body 12 and a sub-body 13). The main body 12 contains switching devices (semiconductor modules 21) of the voltage converter circuits 9*a* to 9*f* and the inverter circuit 8, a control board 26, a capacitor unit 27, and three reactors 4. The sub-body 13 contains the remaining three reactors 4. A cable 49 which electrically connects the main body 12 and the sub-body 13 is connected to a rear part of the sub-body 13 and a lateral rear part of the main body 12.

The main body 12 and the sub-body 13 are coupled to each other so as to be next to each other in a vehicle width direction. The main body 12 and the sub-body 13 are coupled to each other such that a front end of the main body 12 aligns with a front end of the sub-body 13. The main body 12 and the sub-body 13 are fixed to the vehicle (cross-plate 43) by a front bracket 45 and rear brackets 46*a* and 46*b* such that a gap SP is secured below the bodies.

The reactors 4 are bulkier than the other electronic components. The main body 12 contains some reactors 4 and other components (such as the semiconductor modules 21 and the control board 26). Some of all reactors 4 that can be contained with high space efficiency together with other components in the main body 12 are contained in the main body 12. The remaining reactors 4 that cannot be contained with high efficiency in the main body 12 are contained in the sub-body 13. The plurality of bulky reactors 4 can be contained with high space efficiency by dispersedly containing them in two bodies (namely the main body 12 and the sub-body 13).

The main body 12 and the sub-body 13 are electrically connected to each other by the cable 49. When the vehicle has a frontal collision, the power converter 10 may be subjected to impact from the front. The main body 12 and the sub-body 13 are supported by the front bracket 45 and the rear brackets 46*a* and 46*b* such that there is a gap therebelow. When subjected to impact from the front, the main body 12 and the sub-body 13 have space for retraction. That is, when the main body 12 and the sub-body 13 are subjected to impact from the front, the brackets 45, 46*a*, and 46*b* deform, so that the main body 12 and the sub-body 13 move back downward. The main body 12 and the sub-body 13 cushion the impact by retracting.

Furthermore, the main body 12 and the sub-body 13 are coupled to each other such that the front end of the main body 12 aligns with the front end of the sub-body 13. The straight line L shown in FIGS. 2, 3, and 6 indicates the position of a front end that is common to the main body 12 and the sub-body 13. As shown in FIG. 6, when the vehicle has a frontal collision, an obstacle OB may collide with the power converter 10 from the front of the power converter 10. The obstacle OB makes contact with the front end of the main body 12 and the front end of the sub-body 13 at the same time. Since the impact from the front is received by both the main body 12 and the sub-body 13, the impact force is dispersed, so that it becomes hard for the sub-body 13 to come off from the main body 12. Therefore, the cable 49 to which a high voltage is applied, hardly comes off. The connection of the cable 49 to the rear end (rear side plate) of the sub-body 13 also contributes to making it hard for the cable 49 to come off at the time of a frontal collision.

Points to keep in mind regarding the technology described in the embodiment are presented. The power converter 10 includes six reactors 4. The present disclosure is applicable to a mounting structure in a vehicle for a power converter including two or more reactors. The main body contains at least one reactor and electronic components such as switching devices, and the sub-body contains the remaining reactors.

The present disclosure relates to a mounting structure in a vehicle for a power converter that converts power of a DC power source into power that drives a drive motor. Electric vehicles in which the power converter is mounted include a hybrid car including a motor and an engine and an automobile including a fuel cell as a DC power source.

As such, specific examples of the present invention have been described in detail, however, these are mere exemplary indications and thus do not limit the scope of the claims. The art described in the claims include modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A mounting structure for a power converter in a vehicle, the power converter including a plurality of voltage converter circuits connected in parallel, each of the plurality of voltage converter circuits including a reactor, wherein the power converter comprises:

a main body containing at least one of the reactors and a switching device of the voltage converter circuits; and a sub-body containing remaining reactors, the sub-body being electrically connected to the main body by a cable, the main body is fixed to a vehicle body via a bracket in a front compartment such that a gap is provided below the main body, and the sub-body is connected to a lateral side of the main body in a vehicle width direction such that a front end of the sub-body aligns with a front end of the main body.

2. The mounting structure for the power converter as in claim 1, wherein the cable electrically connecting the main body and the sub-body is connected to a rear side face of the sub-body.

* * * * *